No. 799,506. PATENTED SEPT. 12, 1905.
A. W. WEATHERLY.
STALK CUTTER.
APPLICATION FILED FEB. 25, 1905.
2 SHEETS—SHEET 1.
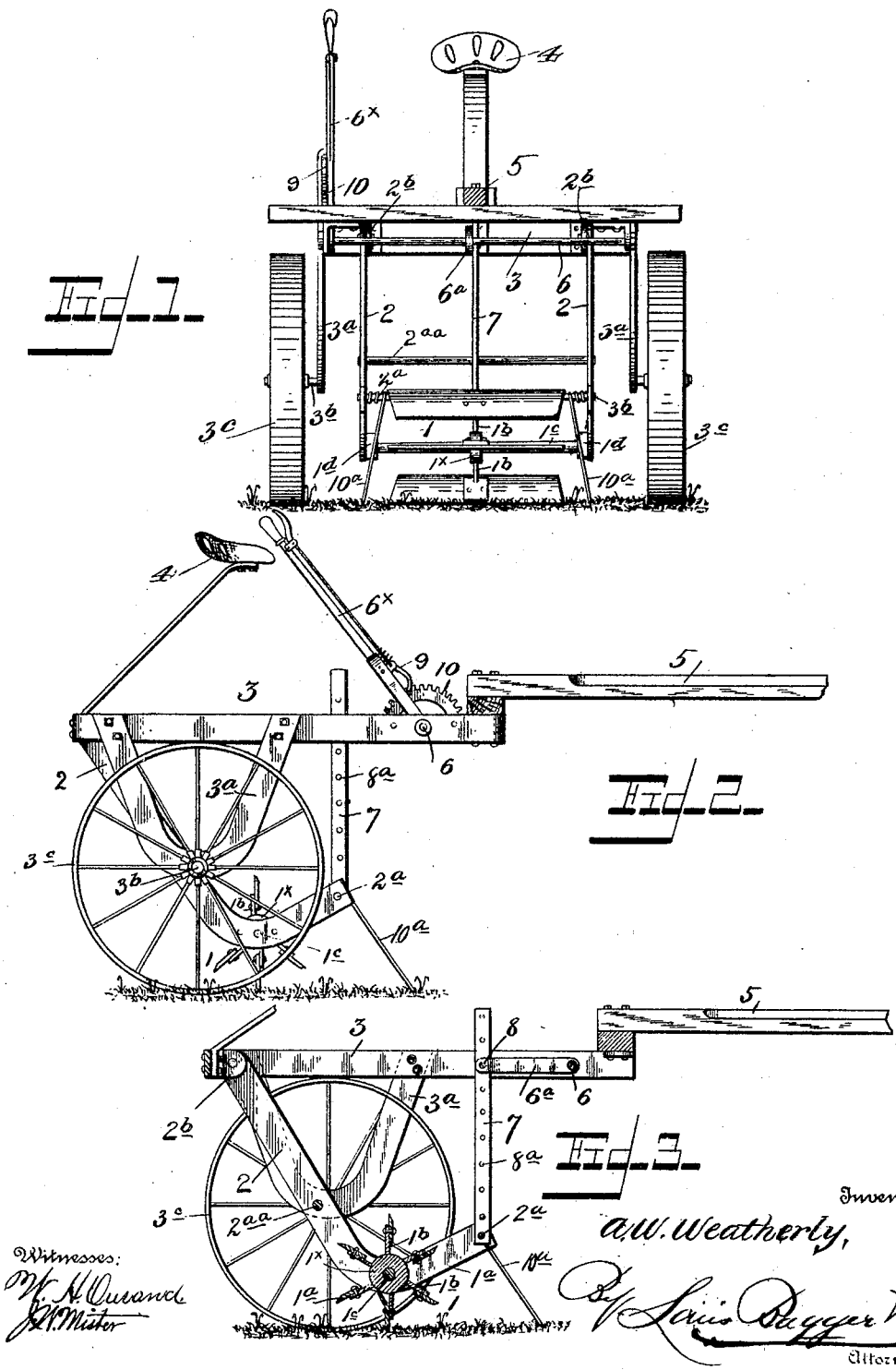

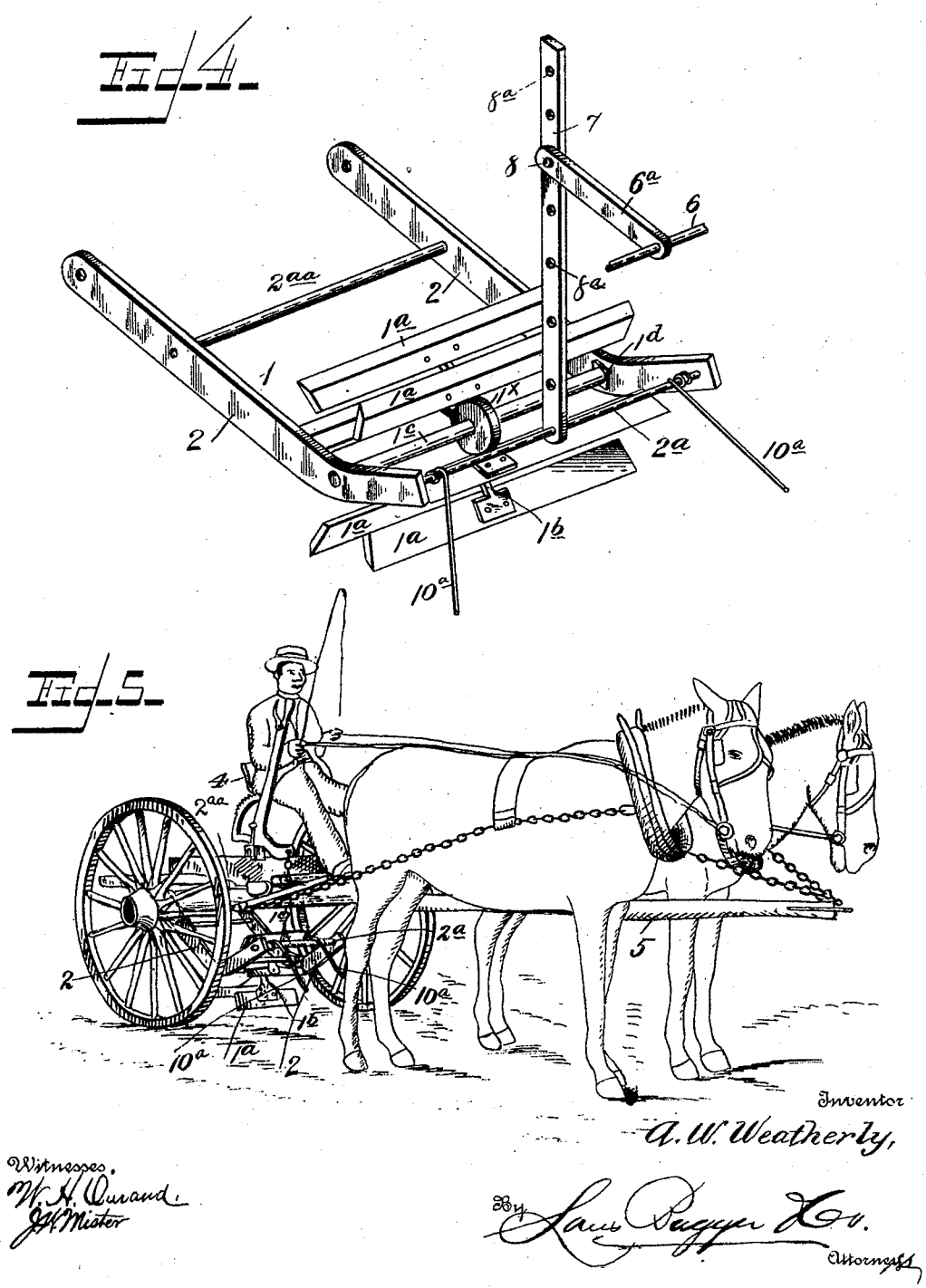

UNITED STATES PATENT OFFICE.

ABNER W. WEATHERLY, OF ALVIN, SOUTH CAROLINA.

STALK-CUTTER.

No. 799,506.　　　Specification of Letters Patent.　　　Patented Sept. 12, 1905.

Application filed February 25, 1905. Serial No. 247,321.

*To all whom it may concern:*

Be it known that I, ABNER W. WEATHERLY, a citizen of the United States, residing at Alvin, a citizen of Berkeley and State of South Carolina, have invented new and useful Improvements in Stalk-Cutters, of which the following is a specification.

My invention relates to improvements in stalk-cutters.

It has for its object to greatly simplify construction, to provide for engaging and disposing the objects to be cut so as to present them to the cutter for more readily cutting the same than would otherwise be the case, and to effect the ready actuation of the parts.

Said invention consists of certain detailed structural features, substantially as hereinafter more fully disclosed and specifically pointed out by the claims.

In the accompanying drawings, illustrating the preferred embodiment of my invention, Figure 1 is a front elevation thereof. Fig. 2 is a side elevation, and Fig. 3 is a vertical longitudinal section, of the same. Fig. 4 is an enlarged detached view of the cutter proper with attached spring raking device. Fig. 5 is a view showing the device applied to the front running-gear, including the hounds and front wheels, with their axle, of a vehicle.

In the carrying out of my invention I provide a rotating cutter 1, consisting of a plurality or number of horizontal radial blades or knives $1^a$, centrally secured edgewise to radial arms $1^b$, preferably formed with a disk $1^x$, suitably secured upon a rod or journal $1^c$, freely supported or turning in lateral bearings $1^d$, carried at the angles or vertices of approximately V-shaped lateral bars 2, secured together at their forward ends by a rod or cross-bar $2^a$ and by an additional cross-bar $2^{aa}$, secured thereto in rear of the cutter. The rear upper ends of the bars 2 are pivoted to clips $2^b$, adapted to be applied and suitably held to the rear bar of a carrying-frame 3, having suitable pendants or hangers $3^a$, provided with short axle members $3^b$ for wheels $3^c$, traveling upon the surface, said frame having suitably mounted thereon the driver's seat 4 and secured to its forward end the usual draft-bar or pole 5. Said cutter-carrying arms or frame 2 have connected to their forward end cross-bar $2^a$ a lever-actuated cranked rod or shaft 6, bearing in the frame 3, said connection being effected by means of a bar or link 7, loosely connected to said cross-bar and adjustably connected to the crank-arm $6^a$ of the part or member 6, a suitable screw or pin 8, and a series of apertures $8^a$, produced in the bar 7, providing therefor. Such adjustment is for the accommodating of the cutter to the height or point it may be desired to sever the stalks, and by suitably disposing or adjusting the lever $6^x$ of the cranked rod or shaft 6, equipped with a spring-actuated detent or pawl 9, engaging a rack 10, secured to the frame 3, the cutter may be elevated and be thus held, as when transferring the machine from one part of a field to the other or going thereto and returning therefrom. Spring-metal teeth $10^a$, each twisted around the cross-bar $2^a$ near one end and suitably secured to the lateral bars 2, extend downward and forward laterally to reach outward and pull the plants or stalks inward toward the cutter to enable the latter to more advantageously engage or dispose said stalks as the machine advances, and thus provide for more effectively cutting or severing the same than would otherwise be the case, as will be appreciated. It will also be noted that as the machine is drawn along the field the engagement or contact thus effected between the blades and the stalks will while causing the severing or cutting of said stalks also in performing that act effect the rotation of the cutter, and thus bring each blade successively into action, thereby obviating the use of gearing or other mechanical appliances for that purpose.

It is noted that, as shown in Fig. 5, the cutter-carrying arms or frame may be readily detached from the transporting-frame, as herein shown and described, and be as readily connected to the front part of the running-gear, including the hounds, &c., of a vehicle for practical use, the other adjunctive parts necessary to the retention of said arms or frame, with the cutter in working position, being suitably supplied thereto, as in the application of said parts to the first named.

Latitude is allowed as to details herein, since they may be changed as circumstances may suggest without departing from the spirit of my invention and the latter still be protected.

I claim—

1. A machine of the character described, comprising a frame having approximately V-shaped lateral bars, with their rearward and upward extending portions connected to means mounted for transportation and the forward and upward inclined portions of said lateral bars having their connecting cross-bar equipped with spring raking-teeth, with their upper coiled ends encompassing said connecting-bar and their effective portions extending straight downward and forward their entire lengths for the purpose stated, means for supporting said forward portions of said lateral bars, and a chopper hung rotatably between said lateral bars, in rear of said spring-teeth.

2. A machine of the character described, comprising approximately V-shaped lateral bars with their rearward and upward inclined portions connected to means mounted for transportation, and the forward and upward inclined portions of said lateral bars having their connecting cross-bar equipped with spring raking-teeth, extending straight downward and forward, a chopper hung in rear of said raking-teeth rotatably between said lateral bars, and a forward end suspending and adjusting bar for said frame, connected to said transporting means.

In testimony whereof I have signed my name to this specification in the presence of two subscribing witnesses.

A. W. WEATHERLY.

Witnesses:
E. J. DENNIS, Jr.,
SAM HEITUER.